United States Patent
Giordano et al.

(10) Patent No.: US 12,434,767 B2
(45) Date of Patent: Oct. 7, 2025

(54) METHOD FOR DETERMINING WHETHER AN AUTOMATIC COLLISION AVOIDANCE STEERING MANEUVER SHOULD BE EXECUTED OR NOT

(71) Applicant: ZENSEACT AB, Gothenburg (SE)

(72) Inventors: Giuseppe Giordano, Gothenburg (SE); Lars Johannesson Mårdh, Torslanda (SE)

(73) Assignee: ZENSEACT AB, Gothenburg (SE)

( * ) Notice: Subject to any disclaimer, the term of this patent is extended or adjusted under 35 U.S.C. 154(b) by 202 days.

(21) Appl. No.: 18/476,407

(22) Filed: Sep. 28, 2023

(65) Prior Publication Data
US 2024/0124060 A1    Apr. 18, 2024

(30) Foreign Application Priority Data
Oct. 17, 2022   (EP) ..................... 22201807

(51) Int. Cl.
*B62D 15/02*   (2006.01)
*B60W 30/09*   (2012.01)

(52) U.S. Cl.
CPC ......... *B62D 15/0265* (2013.01); *B60W 30/09* (2013.01); *B60W 2520/125* (2013.01); *B60W 2710/20* (2013.01)

(58) Field of Classification Search
CPC ............ B62D 15/0265; B60W 30/09; B60W 2520/125; B60W 2710/20;
(Continued)

(56) References Cited
U.S. PATENT DOCUMENTS
8,209,090 B2   6/2012  Arbitmann et al.
11,904,896 B2*  2/2024  Inaba ............... B60W 60/0053
(Continued)

FOREIGN PATENT DOCUMENTS
EP    3971526 A1    3/2022

OTHER PUBLICATIONS
Ammour, M. et al.; "Collision avoidance for autonomous vehicle using MPC and time varying Sigmoid safety constraints"; IFAC PapersOnLine 54-10 (2021); pp. 39-44 (6 pages).
(Continued)

*Primary Examiner* — Sze-Hon Kong
(74) *Attorney, Agent, or Firm* — Sage Patent Group

(57) ABSTRACT

A method for determining whether an automatic collision avoidance steering maneuver for a vehicle equipped with an automated driving system should be executed is disclosed. The method includes: obtaining a predicted vehicle trajectory for execution of the collision avoidance steering maneuver, wherein the predicted vehicle trajectory comprises a predicted lateral acceleration and a predicted lateral jerk of the vehicle; obtaining a first threshold of attainable lateral acceleration and a second threshold of attainable lateral jerk of the vehicle; determining whether the predicted vehicle trajectory is attainable by comparing the predicted lateral acceleration with the first threshold and the predicted lateral jerk with the second threshold; if yes, communicating that the automatic collision avoidance steering maneuver shall be executed; if not, determining a lateral offset of the vehicle based on the predicted lateral acceleration and the predicted lateral jerk of the predicted vehicle trajectory and the first and second threshold.

15 Claims, 5 Drawing Sheets

(58) Field of Classification Search
CPC .......... B60W 2520/10; B60W 10/184; B60W 10/20; B60W 2552/53; B60W 2720/125; B60W 30/0953; B60W 40/105; B60W 2520/06; B60W 2520/105; B60T 2230/04
See application file for complete search history.

(56) References Cited

U.S. PATENT DOCUMENTS

| | | | |
|---|---|---|---|
| 2008/0208408 A1* | 8/2008 | Arbitmann | B60W 10/20 701/41 |
| 2013/0054128 A1 | 2/2013 | Moshchuk et al. | |
| 2014/0032049 A1 | 1/2014 | Moshchuk et al. | |
| 2014/0207364 A1 | 7/2014 | Eidehall et al. | |
| 2015/0158528 A1 | 6/2015 | Moshchuk et al. | |
| 2021/0114617 A1* | 4/2021 | Phillips | G01C 21/3453 |
| 2021/0339741 A1* | 11/2021 | Rezvan Behbahani | B60W 30/0956 |
| 2022/0089151 A1* | 3/2022 | Gyllenhammar | G08G 1/166 |
| 2022/0144308 A1* | 5/2022 | Takhmar | B60W 30/0956 |
| 2022/0176995 A1* | 6/2022 | Subramanian | B60W 30/08 |
| 2022/0258728 A1* | 8/2022 | Heirung | B60W 40/04 |
| 2023/0347888 A1* | 11/2023 | Ueno | B60W 60/0013 |
| 2025/0018961 A1* | 1/2025 | Ueno | B60W 30/12 |

OTHER PUBLICATIONS

Extended European Search Report mailed Mar. 29, 2023 for European Application No. 22201807.9, 5 pages.

\* cited by examiner

METHOD FOR DETERMINING WHETHER AN AUTOMATIC COLLISION AVOIDANCE STEERING MANEUVER SHOULD BE EXECUTED OR NOT

CROSS-REFERENCE TO RELATED APPLICATIONS

The present application for patent claims priority to European Patent Office Application Ser. No. 22201807.9, entitled "A METHOD FOR DETERMINING WHETHER AN AUTOMATIC COLLISION AVOIDANCE STEERING MANEUVER SHOULD BE EXECUTED OR NOT" filed on Oct. 17, 2022, assigned to the assignee hereof, and expressly incorporated herein by reference.

TECHNICAL FIELD

The present invention relates to the field of autonomous and semi-autonomous vehicles. In particular it is related to methods and systems for emergency steering features.

BACKGROUND OF THE INVENTION

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC), collision avoidance system, forward collision warning, lane support systems, etc.—are electronic systems that may aid a vehicle driver while driving. Today, there is ongoing research and development within a number of technical areas associated to both the ADAS and the Autonomous Driving (AD) field. ADAS and AD may also be referred to under the common term Automated Driving System (ADS) corresponding to all of the different levels of automation as for example defined by the SAE J3016 levels (0-5) of driving automation.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g., radar, LIDAR, sonar, camera, navigation system e.g., GPS, odometer and/or inertial measurement units (IMUs), upon which advanced control systems may interpret sensory information to identify appropriate navigation paths, as well as obstacles, free-space areas, and/or relevant signage.

ADS features as described above are, however, bound to be required to function with a high integrity to provide sufficiently low risk for the vehicle occupant(s) as well as their surrounding environments. Ensuring that the risk is sufficiently low may require intractable amounts of data for statistical proofs, and would, according to an example, take e.g., approximately a hundred vehicles to drive continuously for five centuries, to acquire. There are several approaches to minimize the risk of the ADS features before they are launched onto public roads. However, on top of this, it is generally believed that the ADS features should be monitored once in the field, in order to ensure that they adhere to required safety levels.

One feature of the ADS is the so called Emergency Steering Function (ESF), which refers to a control function which can automatically detect a potential collision and automatically activate the vehicle's steering system for a limited duration to steer the vehicle with the purpose of avoiding or mitigating a collision. However, designing such a feature is no straight forward task as it has to fulfill various safety regulations. There is therefore a need for new and improved solutions relating to automatic collision avoidance systems.

SUMMARY OF THE INVENTION

The herein disclosed technology seeks to mitigate, alleviate or eliminate one or more of the above-identified deficiencies and disadvantages in the prior art to address various problems relating to automatic collision systems of autonomous or semi-autonomous vehicles.

The inventors of the present inventive concept have realized, since there is difficulty in achieving an emergency steering function which both fulfils the regulations and (if possible) avoid the collision, an improved way of performing an automatic collision avoidance steering maneuver without leaving the ego-lane. This may aid in fulfilling e.g., the UN Regulation No. 79 revision 4 (UNECE 2018) which regulates that the emergency steering function shall not lead to the vehicle leaving the ego-lane.

Various aspects and embodiments of the disclosed invention are defined below and in the accompanying independent and dependent claims.

According to a first aspect of the present inventive concept, there is provided a computer-implemented method for determining whether an automatic collision avoidance steering maneuver for a vehicle equipped with an automated driving system, ADS, should be executed or not. The method comprises obtaining a predicted vehicle trajectory for execution of the collision avoidance steering maneuver, wherein the predicted vehicle trajectory comprises a predicted lateral acceleration and a predicted lateral jerk of the vehicle along the predicted vehicle trajectory. The method further comprises obtaining a first threshold of attainable lateral acceleration and a second threshold of attainable lateral jerk of the vehicle. The method further comprises determining whether the predicted vehicle trajectory is attainable or not by comparing the predicted lateral acceleration with the first threshold and the predicted lateral jerk with the second threshold. The method further comprises, in response to the predicted vehicle trajectory being attainable, communicating, to a control system of the vehicle, that the automatic collision avoidance steering maneuver shall be executed. The method further comprises, in response to the predicted vehicle trajectory not being attainable, determining a lateral offset of the vehicle along the predicted vehicle trajectory based on the predicted lateral acceleration and the predicted lateral jerk of the predicted vehicle trajectory and the first and second threshold. The method further comprises, in response to the lateral offset being smaller than or equal to a third threshold, communicating, to the control system of the vehicle, that the automatic collision avoidance steering maneuver shall be executed. The method further comprises, in response to the lateral offset being greater than the third threshold, communicating to the control system of the vehicle, that the automatic collision avoidance steering maneuver shall not be executed.

A possible associated advantage of the present inventive concept is that it provides an improved way of evaluating the automatic collision avoidance steering maneuver, in particular for emergency steering functions for avoiding obstacles in lane. This may facilitate a more robust and secure ADS, e.g., in that it can take better decisions in a wider range of scenarios.

Further, the two level evaluation (i.e., first comparing against attainable parameters and then against a lateral offset) allows for a more efficient evaluation. Firstly, the first level of evaluation allows the ADS to quickly get a verification of the automatic collision avoidance steering maneuver in the case the predicted vehicle trajectory is attainable. This may be advantageous in that a quick decision may improve the risk of avoiding the collision. Secondly, the second level of evaluation allows for increased flexibility in what collision avoidance steering maneuvers are allowed to be executed, since a predicted vehicle trajectory which is not attainable, can still be allowed depending on the lateral offset. This may lead to an ADS which is able to perform a collision avoidance steering maneuver in a wide range of scenarios.

A reason why the collision avoidance steering maneuver should not be allowed to be executed may depend on different limiting factors. One limiting factor may be related to vehicle dynamics. For example, the traction of the vehicle may put a physical limitation to what maneuvers the vehicle can achieve. Another limiting factor may be related to security aspects or regulations related to ADS features. For example, the AES may be required to only perform steering maneuvers which a driver of the vehicle is able to overcome. The present inventive concept facilitates an improved way of evaluating the collision avoidance steering maneuver based on this.

According to an alternative embodiment of the first aspect, the method comprises obtaining a predicted vehicle trajectory for execution of the collision avoidance steering maneuver, wherein the predicted vehicle trajectory comprises a predicted lateral acceleration and a predicted lateral jerk of the vehicle along the predicted vehicle trajectory; obtaining a first threshold of attainable lateral acceleration and a second threshold of attainable lateral jerk of the vehicle; determining whether the predicted vehicle trajectory is attainable or not by comparing the predicted lateral acceleration with the first threshold and the predicted lateral jerk with the second threshold; in response to the predicted vehicle trajectory being attainable, communicating, to a control system of the vehicle, that the automatic collision avoidance steering maneuver shall be executed; and, in response to the predicted vehicle trajectory not being attainable, communicating to the control system of the vehicle, that the automatic collision avoidance steering maneuver shall not be executed. Optionally, the method may further comprise: in response to the predicted vehicle trajectory not being attainable, determining a lateral offset of the vehicle along the predicted vehicle trajectory based on the predicted lateral acceleration and the predicted lateral jerk of the predicted vehicle trajectory and the first and second threshold; in response to the lateral offset being smaller than or equal to a third threshold, communicating, to the control system of the vehicle, that the automatic collision avoidance steering maneuver shall be executed; in response to the lateral offset being greater than the third threshold, communicating to the control system of the vehicle, that the automatic collision avoidance steering maneuver shall not be executed.

According to a second aspect, there is provided a (non-transitory) computer-readable storage medium. The non-transitory computer-readable storage medium stores one or more programs configured to be executed by one or more processors of a processing system, the one or more programs comprising instructions for performing the method according to any embodiment of the first aspect. With this second aspect of the present inventive concept, similar advantages and preferred features are present as in the other aspects.

According to a third aspect of the present inventive concept, there is provided a device for determining whether an automatic collision avoidance steering maneuver for a vehicle equipped with an automated driving system, ADS, should be executed or not. The device comprises control circuitry configured to obtain a predicted vehicle trajectory for execution of the collision avoidance steering maneuver, wherein the predicted vehicle trajectory comprises a predicted lateral acceleration and a predicted lateral jerk of the vehicle along the predicted vehicle trajectory. The control circuitry is further configured to obtain a first threshold of attainable lateral acceleration and a second threshold of attainable lateral jerk of the vehicle. The control circuitry is further configured to determine whether the predicted vehicle trajectory is attainable or not by comparing the predicted lateral acceleration with the first threshold and the predicted lateral jerk with the second threshold. The control circuitry is further configured to, in response to the predicted vehicle trajectory being attainable, communicate, to a control system of the vehicle, that the automatic collision avoidance steering maneuver shall be executed. The control circuitry is further configured to, in response to the predicted vehicle trajectory not being attainable, determine a lateral offset of the vehicle along the predicted vehicle trajectory based on the predicted lateral acceleration and the predicted lateral jerk of the predicted vehicle trajectory and the first and second threshold. The control circuitry is further configured to, in response to the lateral offset being smaller than or equal to a third threshold, communicate, to the control system of the vehicle, that the automatic collision avoidance steering maneuver shall be executed. The control circuitry is further configured to, in response to the lateral offset being greater than the third threshold, communicate to the control system of the vehicle, that the automatic collision avoidance steering maneuver shall not be executed. With this third aspect of the present inventive concept, similar advantages and preferred features are present as in the other aspects.

According to an alternative embodiment of the third aspect, the control circuitry is configured to obtain a predicted vehicle trajectory for execution of the collision avoidance steering maneuver, wherein the predicted vehicle trajectory comprises a predicted lateral acceleration and a predicted lateral jerk of the vehicle along the predicted vehicle trajectory; obtain a first threshold of attainable lateral acceleration and a second threshold of attainable lateral jerk of the vehicle; determine whether the predicted vehicle trajectory is attainable or not by comparing the predicted lateral acceleration with the first threshold and the predicted lateral jerk with the second threshold; in response to the predicted vehicle trajectory being attainable, communicate, to a control system of the vehicle, that the automatic collision avoidance steering maneuver shall be executed; in response to the predicted vehicle trajectory not being attainable, communicate to the control system of the vehicle, that the automatic collision avoidance steering maneuver shall not be executed. Optionally, the control circuitry may be further configured to: in response to the predicted vehicle trajectory not being attainable, determine a lateral offset of the vehicle along the predicted vehicle trajectory based on the predicted lateral acceleration and the predicted lateral jerk of the predicted vehicle trajectory and the first and second threshold; in response to the lateral offset being smaller than or equal to a third threshold, communicate, to the control system of the vehicle, that the automatic collision avoidance steering maneuver shall be executed; in response to the lateral offset being greater than the third threshold, communicate to the control system of the vehicle, that the automatic collision avoidance steering maneuver shall not be executed.

According to a fourth aspect, there is provided a vehicle comprising an automated driving system, ADS, configured to execute an automatic collision avoidance steering maneuver, and a device for determining whether an automatic collision avoidance steering maneuver of the vehicle should be executed or not according to any embodiment of the third aspect. With this fourth aspect of the present inventive concept, similar advantages and preferred features are present as in the other aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

Figure 1:
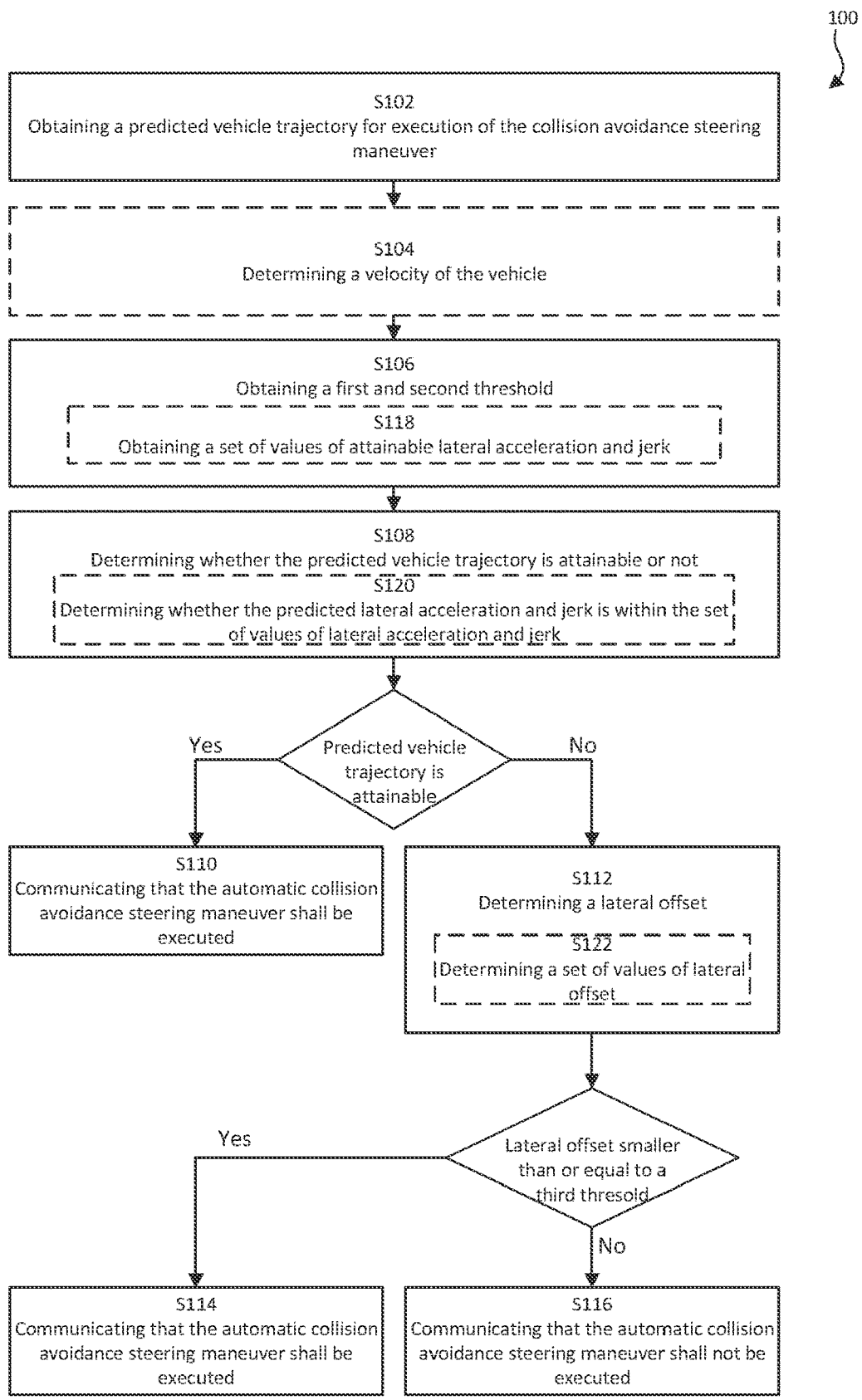
FIG. 1 is a schematic flowchart representation of a method for determining whether an automatic collision avoidance steering maneuver for a vehicle equipped with an automated driving system, ADS, should be executed or not in accordance with some embodiments.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus or device comprising one or more processors, one or more memories coupled to the one or more processors, where computer code is loaded to implement the method. For example, the one or more memories may store one or more computer programs that perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative. The term "obtaining" is herein to be interpreted broadly and encompasses receiving, retrieving, collecting, acquiring, and so forth.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

FIG. 1 is a schematic flowchart representation of a method 100 for determining whether an automatic collision avoidance steering maneuver for a vehicle equipped with an automated driving system, ADS, should be executed or not. Below, the different steps are described in more detail. Even though illustrated in a specific order, the steps of the method 100 may be performed in any suitable order as well as multiple times. Thus, although FIG. 1 may show a specific order of method steps, the order of the steps may differ from what is depicted. In addition, two or more steps may be performed concurrently or with partial concurrence. For example, the steps of obtaining data (such as the predicted vehicle trajectory and the first and second thresholds as described below) may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various steps. The above mentioned and described embodiments are only given as examples and should not be limiting to the present invention. Other solutions, uses, objectives, and functions within the scope of the invention as claimed in the below described patent claims should be apparent for the person skilled in the art.

The wording "automated driving system" is herein used as a common term for all features related to the control and operation of the autonomous part of an autonomous or semi-autonomous vehicle. The ADS can comprise different ADS features (may also be referred to as ADS functions). The ADS may comprise any advanced driver-assistance systems (ADAS) or Autonomous Driving (AD) features. Preferably, the ADS features are level 3 features or higher according to SAE J3016 levels of driving automation for on-road vehicles. The ADS feature may for example be a traffic jam pilot, a highway pilot, or any other SAE J3016 level 3+ ADS feature. The ADS feature may also be a lower level feature such as a lane-assist feature or an adaptive cruise control feature. The present inventive concept may especially relate to an Emergency Steering Function (ESF) or, in other words, an automatic emergency steering (AES) feature. The AES feature may be implemented in an AES module of the ADS or communicatively connected to the AES module. The AES feature may be seen as a feature configured to react to potential emergency situations. For example, the AES feature may output a warning to the driver and/or to execute an intervention so as to control a steering of the vehicle upon detection of certain scenarios. Such a scenario may be a potential collision. The AES feature may be tasked with determining and/or executing a collision avoidance steering maneuver. The term "collision avoidance steering maneuver" should be interpreted as instructions to a control system of the vehicle (e.g., a centralized control system, or a specific sub-system or module of the vehicle) on how to control the steering of the vehicle to avoid a potential collision. In other words, the collision avoidance steering maneuver provides instructions on how the vehicle should drive in order to follow a collision avoidance path avoiding an obstacle. The collision avoidance path may be an in-lane collision avoidance path, i.e., a path avoiding an obstacle while remaining (at least substantially) within the current lane of the vehicle. Since the collision avoidance steering maneuver is closely related to the collision avoidance path, the proposed method 100 may be seen as a method for evaluating a collision avoidance path to determine if it could and/or should be followed or not.

The method 100 comprises obtaining S102 a predicted vehicle trajectory for execution of the collision avoidance steering maneuver. The term "vehicle trajectory" should herein be interpreted as a parametrization of a path along which the vehicle will travel. More specifically, the predicted vehicle trajectory for execution of the collision avoidance steering maneuver may be a parametrization of a collision avoidance path of the vehicle as a result of the collision avoidance steering maneuver being executed. Put differently, the vehicle trajectory may be seen as describing the path of the vehicle in terms of a number of parameters (e.g., velocity, direction, acceleration and/or jerk) at different time instances. For example, the vehicle trajectory may describe the movement of the vehicle at a number of time instances, where each time instance is associated with one or more of a position, velocity, acceleration and jerk of the vehicle. By "predicted" vehicle trajectory, it is herein meant the vehicle trajectory, which the vehicle is expected to travel along if it were to execute the collision avoidance steering maneuver. The predicted vehicle trajectory comprises a predicted lateral acceleration and a predicted lateral jerk of the vehicle along the predicted vehicle trajectory. More specifically, the predicted vehicle trajectory may comprise a number of values of predicted lateral acceleration and predicted lateral jerk corresponding to different positions along the predicted vehicle trajectory (i.e., for the different time instances of the vehicle trajectory). The predicted vehicle trajectory is further discussed in connection with FIG. 3.

The wording "obtaining", as used throughout the present disclosure, should be interpreted broadly and encompasses receiving, retrieving, collecting, acquiring, and so forth. For example, obtaining S102 the predicted vehicle trajectory may comprise determining the predicted vehicle trajectory based on the collision avoidance steering maneuver. Alternatively, obtaining S102 the predicted vehicle trajectory may comprise receiving the predicted vehicle trajectory from an AES module of the vehicle. Thus, the method 100 may be performed externally to the AES module. The predicted vehicle trajectory may be based on the (in-lane) collision avoidance path which the collision avoidance steering maneuver aims to achieve.

The method 100 further comprises obtaining S106 a first threshold of attainable lateral acceleration and a second threshold of attainable lateral jerk of the vehicle. The first and second thresholds can be obtained from a vehicle manufacturer or steering supplier of the vehicle or any other external party. The first and second thresholds can be obtained from a memory of the vehicle on which the first and second thresholds are stored.

By the wording "attainable", as in "attainable lateral acceleration" or "attainable lateral jerk", it is herein meant values of lateral acceleration and lateral jerk that a steering system of the vehicle can achieve without diverging from the predicted vehicle trajectory. Put differently, the steering system (or the vehicle itself) may be limited in regards to what lateral accelerations or lateral jerk is possible or allowed to achieve. The limitations may be due to different reasons, such as physical limitations of the vehicle or other regulations associated with automated driving systems. For example, for ADS level 1 and level 2 features it is envisioned that the (maximum) "attainable lateral acceleration" or (maximum) "attainable lateral jerk" is predefined and set so that a driver of the vehicle will be able to control the vehicle for any single fault in the ADS and vehicle platform. These limitations may thus be represented by the first and second threshold respectively which can be determined as a function of steering limitations implemented in the vehicle, e.g., as a "safety limiter". The first and second threshold of lateral acceleration and lateral jerk respectively, are further discussed in connection with FIG. 5. It should be noted that additional steering capabilities than lateral acceleration and lateral jerk may also be used in determining whether the predicted vehicle trajectory is attainable or not, as is described in the following.

Moving on, the method 100 further comprises determining S108 whether the predicted vehicle trajectory is attainable or not by comparing the predicted lateral acceleration with the first threshold and the predicted lateral jerk with the second threshold. Put differently, it is determined whether the vehicle (or the maneuvering system of the vehicle) will be able to execute the collision avoidance steering maneuver in order to follow the collision avoidance path without exceeding the limitations set by the first and second threshold. The predicted vehicle trajectory being attainable may be interpreted as the vehicle will substantially follow the predicted vehicle trajectory if the collision avoidance steering maneuver is executed. The predicted vehicle trajectory not being attainable may be interpreted as the vehicle will (substantially) diverge from the predicted vehicle trajectory. It should be noted that the step of determining S108 whether the predicted vehicle trajectory is attainable or not can be seen as determining whether the collision avoidance steering maneuver (or collision avoidance path) is as attainable or not since the predicted vehicle trajectory is a result thereof.

The predicted vehicle trajectory may be determined as attainable if the predicted lateral acceleration is smaller than or equal to the first threshold and the predicted lateral jerk is smaller than or equal to the second threshold. Consequently, the predicted vehicle trajectory may be determined as not attainable if the predicted lateral acceleration is greater than the first threshold or the predicted lateral jerk is greater than the second threshold. The predicted lateral acceleration which is compared to the first threshold may be the largest predicted lateral acceleration along the predicted vehicle trajectory. Correspondingly, the predicted lateral jerk which is compared to the second threshold may be the largest predicted jerk along the predicted vehicle trajectory. Further, the predicted lateral acceleration and lateral jerk which is compared to the first and second threshold respectively may be the absolute values of the predicted lateral acceleration and lateral jerk. Thus, the respective threshold may constitute an upper limit of the magnitude of attainable lateral acceleration and attainable lateral jerk. Alternatively, the first and second threshold may define a respective set of attainable lateral acceleration and attainable lateral jerk. Thus, the predicted lateral acceleration and lateral jerk which is compared to the first and second threshold respectively may be both positive and negative values.

The predicted vehicle trajectory may comprise a set of values of predicted lateral acceleration and a set of values of predicted lateral jerk. Put differently, the predicted vehicle trajectory may comprise a value of predicted lateral acceleration and a value of lateral jerk for each of a number of time instances along the vehicle trajectory. In other words, each position along the predicted vehicle trajectory may be associated with a corresponding value of predicted lateral acceleration and predicted lateral jerk. The predicted vehicle trajectory may be determined as attainable if each value of the set of values of predicted lateral acceleration is smaller than or equal to the first threshold and each value of the set of values of predicted lateral jerk is smaller than or equal to the second threshold. Consequently, the predicted vehicle trajectory may be determined as unattainable if at least one of the values of the set of values of predicted lateral acceleration is greater than the first threshold or at least one value of the set of values of predicted lateral jerk is greater than the second threshold.

The step of obtaining S106 the first and second threshold may comprise obtaining S118 a set of values of attainable lateral accelerations and a set of values of attainable lateral jerks of the vehicle. Determining S108 whether the predicted vehicle trajectory is attainable or not may comprise determining S120 whether the predicted lateral acceleration and the predicted lateral jerk is within the set of values of attainable lateral accelerations and the set of values of attainable lateral jerk respectively. It goes without saying that in case the predicted vehicle trajectory comprises a set of values of predicted lateral acceleration and a set of values of predicted lateral jerk, each value of the set of values of predicted lateral acceleration may be compared to the set of values of attainable lateral accelerations and each value of the set of values of predicted lateral jerk may be compared to the set of values of attainable lateral jerk.

Having a set of values of attainable lateral accelerations and a set of values of attainable lateral jerk may allow for a more accurate determination of whether the predicted vehicle trajectory is attainable or not. One reason may be that the attainable lateral acceleration may be dependent on the attainable lateral jerk and vice versa. Further, the attainable lateral acceleration and attainable lateral jerk may be dynamic in that they may depend on other factors, for example, a velocity of the vehicle, or external factors such as road conditions (e.g., road surface, weather etc.) or driving conditions (e.g., visibility, traffic congestion etc.). The set of lateral accelerations and lateral jerks are further discussed in connection with FIG. 5.

The first threshold may be an upper limit of a set of attainable lateral accelerations of the vehicle, such as the set of values of attainable lateral accelerations as described above. Similarly, the second threshold may be an upper limit of a set of attainable lateral jerks of the vehicle, such as the set of values of attainable lateral jerks as described above. It goes without saying that since the lateral acceleration and lateral jerk may take both positive and negative values, either the actual value (i.e., keeping the sign) or the absolute values of the predicted lateral acceleration and the predicted lateral jerk may be compared to the first and second threshold depending on the implementation.

The set of attainable lateral accelerations and the set of attainable lateral jerks may be dependent on a velocity of the vehicle. The method 100 may further comprise determining S104 a velocity of the vehicle along the predicted vehicle trajectory. The step of obtaining S106 the set of values of attainable lateral accelerations and the set of attainable lateral jerk of the vehicle may be based on the determined velocity of the vehicle. More specifically, the set of values of attainable lateral acceleration and the set of attainable lateral jerk which is obtained may be associated with the relevant velocity of the vehicle.

Moving on, the method 100 further comprises, in response to the predicted vehicle trajectory being attainable, communicating S110 to a control system of the vehicle, that the automatic collision avoidance steering maneuver shall be executed. For example, a verification signal may be sent to the AES of the vehicle, or to a control system of the ADS (e.g., to a decision and control module of the ADS). As will be further described in connection with FIG. 2, the method 100 may be performed externally to the AES. Thus, the step of communicating S110 that the automatic collision avoidance steering maneuver shall be executed may be communicated to the AES. Alternatively, the method 100 may be performed as an integral part of the AES. Thus, said step of communicating S110 may be performed internally to a relevant submodule of the AES or to another system of the vehicle, such as a maneuvering system.

In response to the predicted vehicle trajectory not being attainable, the method 100 further comprises determining S112 a lateral offset of the vehicle along the predicted vehicle trajectory based on the predicted lateral acceleration and the predicted lateral jerk of the predicted vehicle trajectory and the first and second threshold.

The lateral offset may be determined iteratively by iterating from a starting point k=0 on the predicted vehicle trajectory to an end point k=N. Each point k corresponds to a different time instance along the predicted vehicle trajectory, separated by a sample time, $t_{sample}$. In case the predicted lateral acceleration and predicted lateral jerk is smaller than or equal to the first and second threshold respectively, the lateral offset O(k) in a point k is set to zero.

Figure 5:
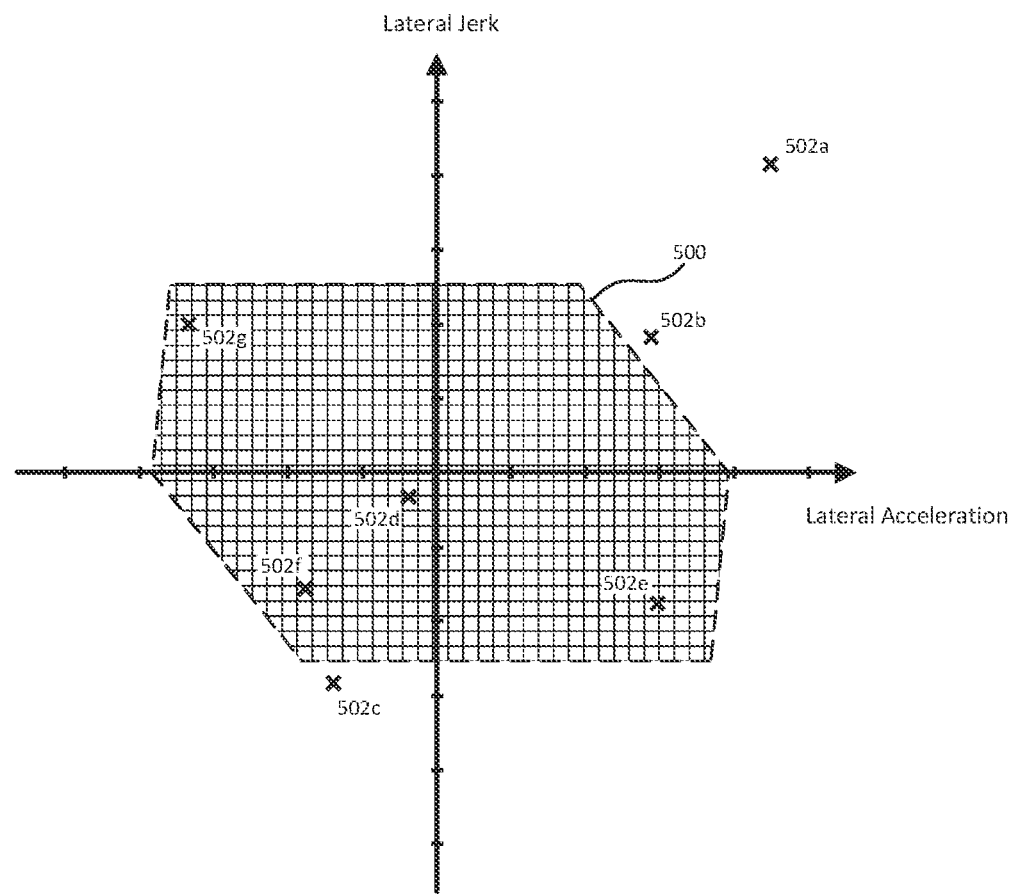
FIG. 5 illustrates, by way of example, a set of attainable lateral accelerations and lateral jerks of a vehicle.

The lateral offset in a point k, O(k), can be determined according to the following, by considering how much the predicted lateral acceleration and predicted lateral jerk exceeds the first and second thresholds. Further, as seen in FIG. 5, the lateral acceleration and lateral jerk can take both positive and negative values, depending on the direction. Thus, the first and second thresholds may comprise both a positive and a negative threshold respectively. More specifically, the first threshold of attainable lateral acceleration may be defined by a first positive threshold, $a_{attainable\_pos}$, and a first negative threshold, $a_{attainable\_neg}$. Correspondingly, the second threshold of attainable lateral jerk may be defined by a second positive threshold, $j_{attainable\_pos}$, and a second negative threshold, $j_{attainable\_neg}$. The lateral offset O(k) can then be determined according to the following two-step algorithm, where $v_{predicted}$ is the predicted lateral velocity, (k−1) denotes the previous point, $t_{sample}$ is the sample time (i.e., time between two consecutive points), $a_{predicted}$ is the predicted lateral acceleration, $j_{predicted}$ is the predicted lateral jerk, $a_{exceeding}$ is the exceeding lateral acceleration, and $j_{exceeding}$ is the exceeding lateral jerk.

In the first step, check if predicted lateral acceleration is attainable. The first step comprises the following.

If $a_{predicted}(k)>0$:
 and if $a_{predicted}(k)>a_{attainable\_pos}(k)$:
  then $a_{exceeding}(k)=a_{predicted}(k)-a_{attainable\_pos}(k)$,
 else, $a_{exceeding}(k)=0$.
Else, (i.e., if $a_{predicted}(k)<0$):
 and if $a_{predicted}(k)<a_{attainable\_neg}(k)$:
  then $a_{exceeding}(k)=a_{predicted}(k)-a_{attainable\_neg}(k)$,
 else, $a_{exceeding}(k)=0$.

The lateral offset O(k) can be determined according to, $$O(k)=O(k-1)+t_{sample}*v_{exceeding}(k),$$

where $v_{exceeding}(k)$ is determined by $v_{exceeding}(k)=v_{predicted}(k-1)+t_{sample}*a_{exceeding}(k)$, and where $v_{predicted}(k)=v_{predicted}(k-1)+t_{sample}*(a_{predicted}(k-1)-a_{attainable}(k-1))$. $a_{attainable}(k-1)$ can be either $a_{attainable\_pos}(k-1)$ or $a_{attainable\_neg}(k-1)$, depending on the situation. The predicted lateral velocity in a point k, i.e., $v_{predicted}(k)$, may be determined using the so-called Euler method (or forward Euler method) as understood from above. It should however be noted that other integration methods may be used as well as readily understood by the skilled person. Another example is the so called backward Euler method.

In the second step, check if predicted lateral jerk is attainable. The second step comprises the following.

If $j_{predicted}(k)>0$:
 and if $j_{predicted}(k)>j_{attainable\_pos}(k)$:
  then $j_{exceeding}(k)=j_{predicted}(k)-j_{attainable\_pos}(k)$,
 else, $j_{exceeding}(k)=0$.
Else, (i.e., if $j_{predicted}(k)<0$):
 and if $j_{predicted}(k)<j_{attainable\_neg}(k)$:
  then $j_{exceeding}(k)=j_{predicted}(k)-j_{attainable\_neg}(k)$,
 else, $j_{exceeding}(k)=0$.

The lateral offset O(k) can be determined according to, $$O(k)=O(k-1)+t_{sample}*v_{exceeding}(k),$$

where $v_{exceeding}(k)$ is determined by $v_{exceeding}(k)=a_{predicted}(k-1)+t_{sample}*a_{exceeding}(k)$ and $a_{exceeding}(k)=a_{exceeding}(k-1)+t_{sample}*j_{exceeding}(k)$.

As can be realized by the skilled person, the equations for determining the lateral offset may be further extended to take into account both total and relative to path quantities of the acceleration and jerk. Further, the derivation of $a_{predicted}$ and $j_{predicted}$ may depend on how the steering collision avoidance path, and thus the predicted vehicle trajectory, is controlled. In case the controller (e.g., a module of a control system 302 of the vehicle 300, tasked with determining control signals for controlling a steering of the vehicle) produces a curvature request with respect to the path to track, this curvature can be directly translated into a lateral jerk request. Hence, the predicted lateral jerk, $j_{predicted}$, in the algorithm can be the resulting lateral jerk from a difference of the lateral jerk request from the controller and the lateral jerk from the predicted trajectory which the vehicle should follow.

Put differently, the method 100 can in short be summarised as follows. Firstly, the lateral offset is determined (e.g., by the algorithm above) for each point k along the predicted vehicle trajectory. Thus, the lateral offset may be calculated for all points along the predicted vehicle trajectory, i.e., also for points where the predicted lateral acceleration and predicted lateral jerk fulfils the first and second thresholds. However, in the points where the predicted lateral acceleration and lateral jerk are attainable, the lateral offset can be set to 0. Secondly, if the lateral offset O(k) for all points k are 0, then the predicted vehicle trajectory is determined as attainable. It can then be communicated to the control system of the vehicle that the collision avoidance steering maneuver shall be executed. Thirdly, if the lateral offset in one or more points are different from 0, the predicted vehicle trajectory can be determined as unattainable. The lateral offset in the points where it is different from zero can then be used to make a decision of whether to execute the collision avoidance steering maneuver or not based on further logic (as will be further described below).

The wording "lateral offset" should herein be interpreted as a measure of an expected offset of the vehicle from the collision avoidance path along a lateral direction. The lateral offset may arise from that the predicted vehicle trajectory is not attainable. Thus, the lateral offset may be based on the predicted lateral acceleration and the predicted lateral jerk of the predicted vehicle trajectory and the first and second threshold. For example, a larger offset can be expected the further the predicted lateral acceleration and the predicted lateral jerk exceeds the first and second thresholds (or the respective set of values) respectively. Similarly, a smaller lateral offset can be expected if the predicted lateral acceleration and lateral jerk only exceeds the respective threshold by a slight amount. The lateral offset may be seen as a path tracking error which results from the predicted lateral acceleration and predicted lateral jerk temporarily exceeding the attainable lateral acceleration and attainable lateral jerk.

The method 100 further comprises, in response to the lateral offset being smaller than or equal to a third threshold, communicating S114, to the control system of the vehicle, that the automatic collision avoidance steering maneuver shall be executed. Thus, even though the predicted vehicle trajectory is not attainable, it may still be within an acceptable error margin. The third threshold may be selected such that the predicted vehicle trajectory with the lateral offset taken into consideration does not exceed a lane boundary or any other criterions such as security regulations. In more detail, the third threshold may be defined such that the predicted vehicle trajectory with the lateral offset taken into consideration results in that no part of the vehicle is allowed to traverse the lane boundary defined by lane markers. However, in some embodiments, the third threshold may be defined such that such that the predicted vehicle trajectory with the lateral offset taken into consideration results in that no part of the vehicle is allowed to traverse the lane marker by more than a defined length (i.e., a lane boundary offset from the lane marker by the defined length). The defined length may for example be a value in the range of 5 cm to 50 cm, and may further be defined based on a road type. For example, the defined length may be longer for situations when the vehicle is traveling on a highway and the adjacent/neighboring lane is for vehicles traveling in the same direction as compared to situations when the vehicle is traveling on a road where the adjacent/neighboring lane is for vehicles traveling in the opposite direction. In other words, the defined length may be dynamically set/defined based on a road type upon which the vehicle is currently traveling.

This may be advantageous in that collision avoidance steering maneuvers resulting in an uncertainty in the predicted vehicle trajectory may still be allowed to be executed. Thus, the ADS may be able to act in a wider range of scenarios resulting in a more secure and capable automated driving system, than the prior art.

In response to the lateral offset being greater than the third threshold, the method 100 further comprises communicating S116 to the control system of the vehicle, that the automatic collision avoidance steering maneuver shall not be executed. Thus, if the collision avoidance steering maneuver results in a predicted vehicle trajectory which is not attainable, and which are not within an acceptable error margin, the collision avoidance steering maneuver is prevented from being executed.

In an alternative embodiment, the step of communicating S114, S116 either that the automatic collision avoidance steering maneuver should be executed or not may be performed in response to a position of the predicted vehicle in the lateral direction, and taking into account the lateral offset, does not exceed/exceeds the third threshold respectively. The third threshold may then be represented by the lane boundary.

The step of determining S112 the lateral offset may comprise determining S122 a set of values of lateral offset, wherein each value of the set of values of lateral offsets is associated with a different point along the predicted vehicle trajectory. Each point may correspond to a different time instance. Further, the third threshold may comprise a set of third thresholds. Each threshold of the set of thresholds may correspond to a point of the different points along the predicted vehicle trajectory. In other words, for each point along the predicted vehicle trajectory there may be a different value of the third threshold. It should however be noted that one or more points along the predicted vehicle trajectory may have the same value of the third threshold. The different points along the predicted vehicle trajectory is illustrated and further discussed in connection with FIGS. 4A and 4B.

Having different values of the third threshold along the predicted vehicle trajectory allows for a dynamic evaluation of the predicted vehicle trajectory and the lateral offset. For example, the third threshold may have different values along the predicted vehicle trajectory depending on different factors.

For example, the third threshold may be based on a distance between the predicted vehicle trajectory and a lane boundary. For example, if the predicted vehicle trajectory is relatively close to the lane boundary (i.e., a relatively small distance between the predicted vehicle trajectory and the lane boundary), the third threshold may have a relatively low value. Thus, a stricter criterion on the automatic collision avoidance steering maneuver can be applied. If instead the predicted vehicle trajectory is relatively far from the lane boundary (i.e., a relatively large distance between the predicted vehicle trajectory and the lane boundary), the third threshold may have a relatively high value. Thus, a more lenient criterion can be applied on the automatic collision avoidance steering maneuver when there is a larger safety margin to the lane boundary.

The step of communicating S114 to the control system of the vehicle, that the automatic collision avoidance steering maneuver shall be executed may be performed in response to each value of the set of lateral offsets being smaller than or equal to a corresponding threshold of the set of thirds thresholds. Consequently, the step of communicating S116 to the control system of the vehicle, that the automatic collision avoidance steering maneuver shall not be executed may be performed in response to at least one value of the set of lateral offsets being greater than its corresponding threshold of the set of third thresholds. In other words, it may be decided whether to execute the collision avoidance steering maneuver or not based on the comparison of the lateral offset with the corresponding value of the third threshold.

Executable instructions for performing these functions are, optionally, included in a computer-accessible medium such as a non-transitory computer-readable storage medium or other computer program product configured for execution by one or more processors.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Figure 2:
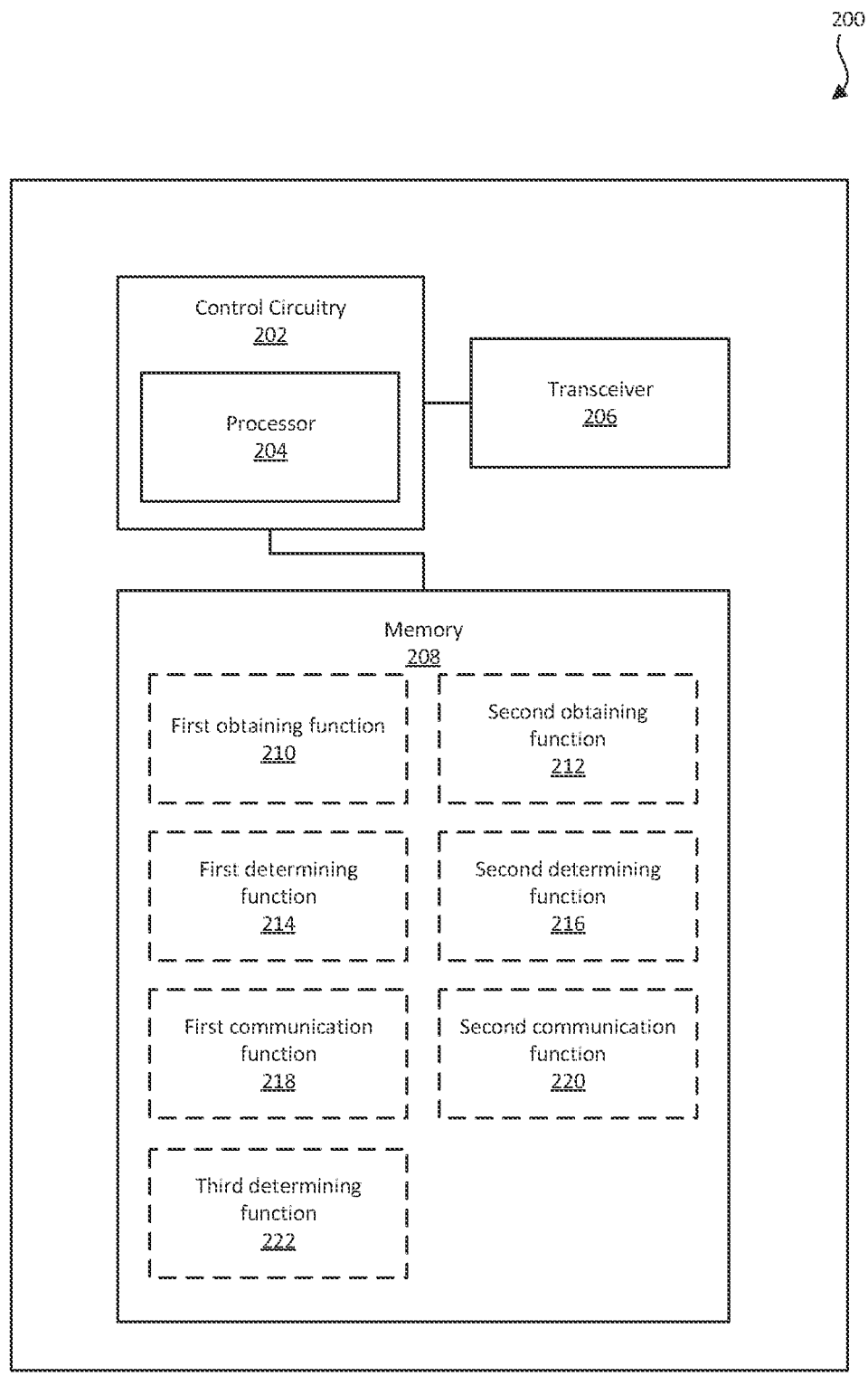
FIG. 2 is a schematic illustration of a device for determining whether an automatic collision avoidance steering maneuver for a vehicle equipped with an automated driving system, ADS, should be executed or not in accordance with some embodiments.

FIG. 2 is a schematic illustration of a device 200 for determining whether an automatic collision avoidance steering maneuver for a vehicle equipped with an automated driving system, ADS, should be executed or not. In particular, the device is configured to perform the techniques described in the foregoing with reference to FIG. 1. Preferably, the device 200 is provided locally in the vehicle. However, as can be readily understood, the device may be provided as an external device to the vehicle, such as a remote server. More specifically, the device 200 may be an integrated device of the ADS of the vehicle. Even more specifically, the device 200 may be an integrated device of an AES module of the ADS. Alternatively, the device 200 may be an external device to the ADS (or to the AES module) and communicatively connected to the ADS (or the AES module). The device 200 may for instance be configured to obtain a predicted vehicle trajectory for execution of the collision avoidance steering maneuver from the ADS (or the AES module), evaluate the predicted vehicle trajectory, and then communicate to the ADS (or the AES module) whether the collision avoidance steering maneuver should be executed or not.

The device 200 comprises control circuitry 202. The control circuitry 202 may physically comprise one single circuitry device. Alternatively, the control circuitry 202 may be distributed over several circuitry devices. As an example, the device 200 may share its control circuitry 202 with other parts of the vehicle, such as the ADS, or other ADS features.

As shown in the example of FIG. 2, the device 200 may further comprise a transceiver 206 and a memory 208. The control circuitry 202 being communicatively connected to the transceiver 206 and the memory 208. The control circuitry 202 may comprise a data bus, and the control circuitry 202 may communicate with the transceiver 206 and/or the memory 208 via the data bus.

The control circuitry 202 may be configured to carry out overall control of functions and operations of the device 200. The control circuitry 202 may include a processor 204, such as a central processing unit (CPU), microcontroller, or microprocessor. The processor 204 may be configured to execute program code stored in the memory 208, in order to carry out functions and operations of the device 200. The control circuitry 202 is configured to perform the steps of the method 100 as described above in connection with FIG. 1. The steps may be implemented in one or more functions stored in the memory 208. The control circuitry 202 may be configured to execute a first obtaining function 210, second obtaining function 212, first determining function 214, a second determining function 216, a first communication function 218, and a second communication function 220. The circuitry 202 may further be configured to execute a third determining function 222. It should be noted that the various function and operation of the device 200 may be implemented in additional functions than those described herein. In addition, one or more of the above functions may be implemented together in a common function. For example, the first and second obtaining function 210, 212 may be implemented in one common obtaining function. The first and second (and optionally the third) determining function 214, 216, (222) may be implemented in one common determining function. The first and second communication function 218, 220 may be implemented in one common communication function.

The transceiver 206 may be configured to enable the device 200 to communicate with other devices. The transceiver 206 may both transmit data from and receive data to the device 200. For example, the device 200 may collect data from other parts of the ADS of the vehicle. Further, the device 200 may transmit data to other parts of the ADS of the vehicle, such as the indication whether the automatic collision avoidance steering maneuver should be executed or not. Even though not explicitly illustrated in FIG. 2, the device 200 may comprise user input devices such as one or more of a keyboard, a mouse, and a touchscreen.

The memory 208 may be a non-transitory computer-readable storage medium. The memory 208 may be one or more of a buffer, a flash memory, a hard drive, a removable media, a volatile memory, a non-volatile memory, a random access memory (RAM), or another suitable device. In a typical arrangement, the memory 208 may include a non-volatile memory for long term data storage and a volatile memory that functions as system memory for the device 200. The memory 208 may exchange data with the circuitry 202 over the data bus. Accompanying control lines and an address bus between the memory 208 and the circuitry 202 also may be present.

Functions and operations of the device 200 may be implemented in the form of executable logic routines (e.g., lines of code, software programs, etc.) that are stored on a non-transitory computer readable recording medium (e.g., the memory 208) of the device 200 and are executed by the circuitry 202 (e.g., using the processor 204). Put differently, when it is stated that the circuitry 202 is configured to execute a specific function, the processor 204 of the circuitry 202 may be configured execute program code portions stored on the memory 208, wherein the stored program code portions correspond to the specific function. Furthermore, the functions and operations of the circuitry 202 may be a stand-alone software application or form a part of a software application that carries out additional tasks related to the circuitry 202. The described functions and operations may be considered a method that the corresponding device is configured to carry out, such as the method 100 discussed above in connection with FIG. 1. Also, while the described functions and operations may be implemented in software, such functionality may as well be carried out via dedicated hardware or firmware, or some combination of one or more of hardware, firmware, and software. The following functions may be stored on the non-transitory computer readable recording medium.

The control circuitry 202 is configured to (e.g., by execution of the first obtaining function 210) obtain a predicted vehicle trajectory for execution of the collision avoidance steering maneuver, wherein the predicted vehicle trajectory comprises a predicted lateral acceleration and a predicted lateral jerk of the vehicle along the predicted vehicle trajectory.

The control circuitry 202 is further configured to (e.g., by execution of the second obtaining function 212) obtain a first threshold of attainable lateral acceleration and a second threshold of attainable lateral jerk of the vehicle.

The control circuitry 202 is further configured to (e.g., by execution of the first determining function 214) determine whether the predicted vehicle trajectory is attainable or not by comparing the predicted lateral acceleration with the first threshold and the predicted lateral jerk with the second threshold.

The control circuitry 202 is further configured to (e.g., by execution of the first communication function 218), in response to the predicted vehicle trajectory being attainable, communicate, to a control system of the vehicle, that the automatic collision avoidance steering maneuver shall be executed. More specifically, it may be communicated to the ADS (or the AES module) of the vehicle.

The control circuitry 202 is further configured to (e.g., by execution of the second determining function 216), in response to the predicted vehicle trajectory not being attainable determine a lateral offset of the vehicle along the predicted vehicle trajectory based on the predicted lateral acceleration and the predicted lateral jerk of the predicted vehicle trajectory and the first and second threshold.

The control circuitry 202 is further configured to (e.g., by execution of the second communication function 220), in response to the lateral offset being smaller than or equal to a third threshold, communicate, to the control system of the vehicle, that the automatic collision avoidance steering maneuver shall be executed.

The control circuitry 202 is further configured to (e.g., by execution of the second communication function 220) in response to the lateral offset being greater than the third threshold, communicate to the control system of the vehicle, that the automatic collision avoidance steering maneuver shall not be executed.

The predicted vehicle trajectory may be determined as attainable if the predicted lateral acceleration is smaller than or equal to the first threshold and the predicted lateral jerk is smaller than or equal to the second threshold. The predicted vehicle trajectory may be determined as not attainable if the predicted lateral acceleration is greater than the first threshold or the predicted lateral jerk is greater than the second threshold.

The predicted vehicle trajectory may comprise a set of values of predicted lateral acceleration and a set of values of predicted lateral jerk. The predicted vehicle trajectory may be determined as attainable if each value of the set of values of predicted lateral acceleration is smaller than or equal to the first threshold and each value of the set of values of predicted lateral jerk is smaller than or equal to the second threshold. The predicted vehicle trajectory may be determined as unattainable if at least one of the values of the set of values of predicted lateral acceleration is greater than the first threshold or at least one value of the set of values of predicted lateral jerk is greater than the second threshold.

Obtaining (e.g., by the second obtaining function 212) the first and second threshold may comprise obtaining a set of values of attainable lateral accelerations and a set of values of attainable lateral jerk of the vehicle. Determining (e.g., by the first determining function 214) whether the predicted vehicle trajectory is attainable or not may comprise determining whether the predicted lateral acceleration and the predicted lateral jerk is within the set of values of attainable lateral accelerations and the set of values of attainable lateral jerk respectively.

The control circuitry may be further configured to (e.g., by the third determining function 222) determine a velocity of the vehicle along the predicted vehicle trajectory. Obtaining (e.g., by the second obtaining function 212) the set of values of attainable lateral accelerations and a set of values of attainable lateral jerk of the vehicle may be based on the determined velocity of the vehicle.

The control circuitry 202 may be further configured to (e.g., by execution of the second determining function 216) determine a set of values of lateral offset, wherein each value of the set of lateral offsets is associated with a different point along the predicted vehicle trajectory. The third threshold may comprise a set of third thresholds, wherein each threshold of the set of third thresholds may correspond to a position of the different positions along the predicted vehicle trajectory. The control circuitry 202 may be further configured to communicate (e.g., by the second communication function 220), to the control system of the vehicle, that the automatic collision avoidance steering maneuver shall be executed, in response to each value of the set of lateral offsets being smaller than or equal to a corresponding threshold of the set of thirds thresholds. The control circuitry 202 may be further configured to (e.g., by the second communication function 220) communicate, to the control system of the vehicle, that the automatic collision avoidance steering maneuver shall not be executed, in response to at least one value of the set of lateral offsets being greater than its corresponding threshold of the set of third thresholds.

It should be noted that features, aspects and advantages of the method 100 as described above in connection with FIG. 1, are applicable also to the device 200 described herein. To avoid undue repetition, reference is made to the above.

Figure 3:
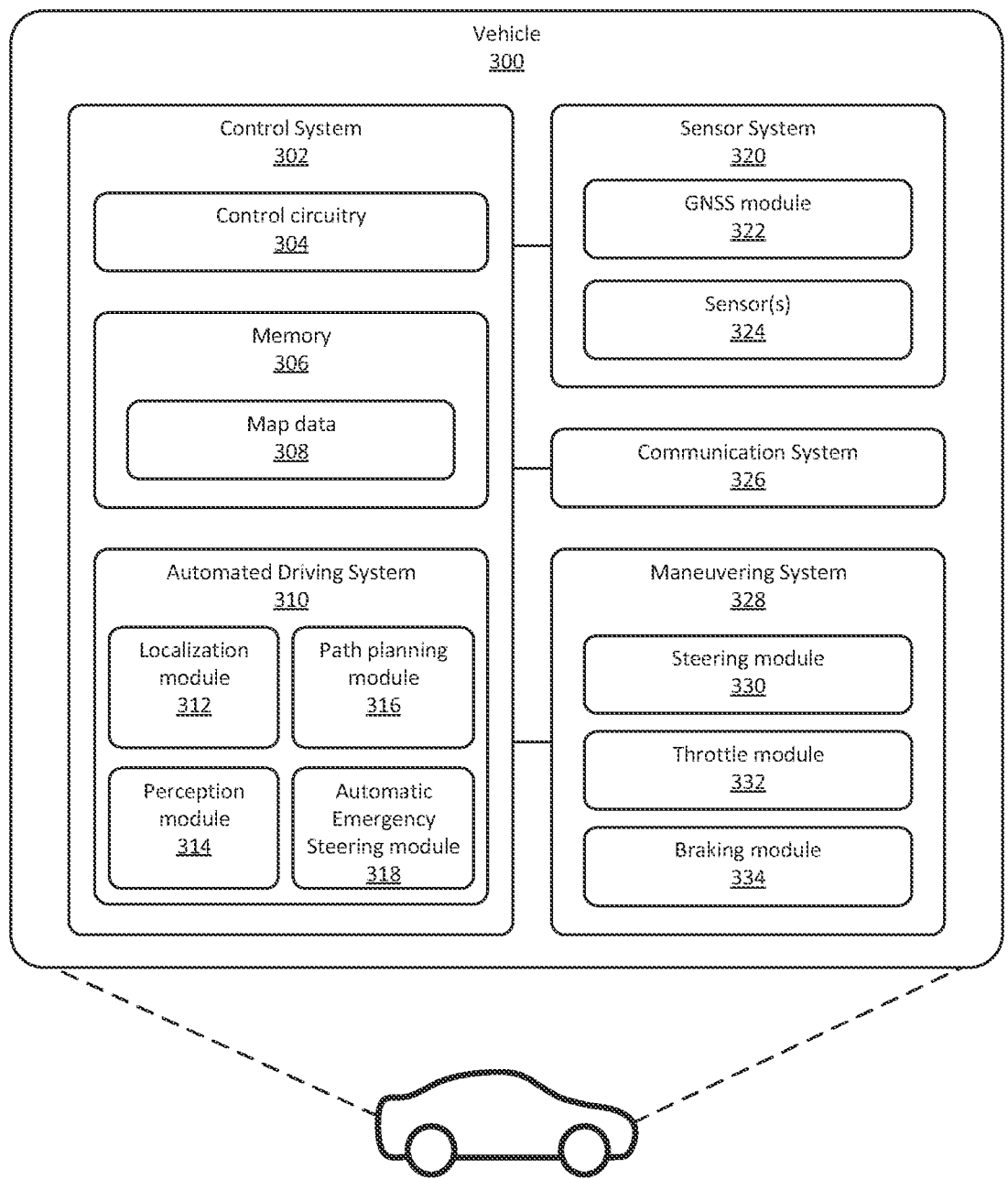
FIG. 3 is a schematic illustration of an ADS-equipped vehicle in accordance with some embodiments.

FIG. 3 is a schematic illustration of an example of a vehicle 300 equipped with an Automated Driving system (ADS) 310 in accordance with some embodiments. As used herein, a "vehicle" is any form of motorized transport. For example, the vehicle 300 may be any road vehicle such as a car (as illustrated herein), a motorcycle, a (cargo) truck, a bus, a smart bicycle, etc.

The vehicle 300 comprises a number of elements which can be commonly found in autonomous or semi-autonomous vehicles. It will be understood that the vehicle 300 can have any combination of the various elements shown in FIG. 3. Moreover, the vehicle 300 may comprise further elements than those shown in FIG. 3. While the various elements is herein shown as located inside the vehicle 300, one or more of the elements can be located externally to the vehicle 300. Further, even though the various elements are herein depicted in a certain arrangement, the various elements may also be implemented in different arrangements, as readily understood by the skilled person. It should be further noted that the various elements may be communicatively connected to each other in any suitable way. The vehicle 300 of FIG. 3 should be seen merely as an illustrative example, as the elements of the vehicle 300 can be realized in several different ways.

The vehicle 300 comprises a control system 302. The control system 302 is configured to carry out overall control of functions and operations of the vehicle 300. The control system 302 comprises control circuitry 304 and a memory 306. The control circuitry 302 may physically comprise one single circuitry device. Alternatively, the control circuitry 302 may be distributed over several circuitry devices. As an example, the control system 302 may share its control circuitry 304 with other parts of the vehicle. The control circuitry 302 may comprise one or more processors, such as a central processing unit (CPU), microcontroller, or microprocessor. The one or more processors may be configured to execute program code stored in the memory 306, in order to carry out functions and operations of the vehicle 300. The processor(s) may be or include any number of hardware components for conducting data or signal processing or for executing computer code stored in the memory 306. The memory 306 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 306 may include database components, object code components, script components, or any other type of information structure for supporting the various activities of the present description.

In the illustrated example, the memory 306 further stores map data 308. The map data 308 may for instance be used by the ADS 310 of the vehicle 300 in order to perform autonomous functions of the vehicle 300. The map data 308 may comprise high-definition (HD) map data. It is contemplated that the memory 308, even though illustrated as a separate element from the ADS 310, may be provided as an integral element of the ADS 310. In other words, according to an exemplary embodiment, any distributed or local memory device may be utilized in the realization of the present inventive concept. Similarly, the control circuitry 304 may be distributed e.g., such that one or more processors of the control circuitry 304 is provided as integral elements of the ADS 310 or any other system of the vehicle 300. In other words, according to an exemplary embodiment, any distributed or local control circuitry device may be utilized in the realization of the present inventive concept.

The vehicle 300 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 300. The sensor system 320 may further comprise one or more sensors 324. The sensor(s) 324 may be any type of on-board sensors, such as cameras, LIDARs and RADARs, ultrasonic sensors, gyroscopes, accelerometers, odometers etc. It should be appreciated that the sensor system 320 may also provide the possibility to acquire sensory data directly or via dedicated sensor control circuitry in the vehicle 300.

The vehicle 300 further comprises a communication system 326. The communication system 326 is configured to communicate with external units, such as other vehicles (i.e., via vehicle-to-vehicle (V2V) communication protocols), remote servers (e.g., cloud servers), databases or other external devices, i.e., vehicle-to-infrastructure (V2I) or vehicle-to-everything (V2X) communication protocols. The communication system 318 may communicate using one or more communication technologies. The communication system 318 may comprise one or more antennas. Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g., IEEE 802.11 based solutions, for communicating with other vehicles in the vicinity of the vehicle 300 or with local infrastructure elements. ETSI is working on cellular standards for vehicle communication and for instance 5G is considered as a suitable solution due to the low latency and efficient handling of high bandwidths and communication channels.

The communication system 326 may further provide the possibility to send output to a remote location (e.g., remote operator or control center) by means of the one or more antennas. Moreover, the communication system 326 may be further configured to allow the various elements of the vehicle 300 to communicate with each other. As an example, the communication system may provide a local network setup, such as CAN bus, I2C, Ethernet, optical fibers, and so on. Local communication within the vehicle may also be of a wireless type with protocols such as WiFi, LoRa, Zigbee, Bluetooth, or similar mid/short range technologies.

The vehicle 300 further comprises a maneuvering system 320. The maneuvering system 328 is configured to control the maneuvering of the vehicle 300. The maneuvering system 328 comprises a steering module 330 configured to control the heading of the vehicle 300. The maneuvering system 328 further comprises a throttle module 332 configured to control actuation of the throttle of the vehicle 300. The maneuvering system 328 further comprises a braking module 334 configured to control actuation of the brakes of the vehicle 300. The various modules of the steering system 328 may receive manual input from a driver of the vehicle 300 (i.e., from a steering wheel, a gas pedal and a brake pedal respectively). However, the maneuvering system 328 may be communicatively connected to the ADS 310 of the vehicle, to receive instructions on how the various modules should act. Thus, the ADS 310 can control the maneuvering of the vehicle 300.

As stated above, the vehicle 300 comprises an ADS 310. The ADS 310 may be part of the control system 302 of the vehicle. The ADS 310 is configured carry out the functions and operations of the autonomous functions of the vehicle 300. The ADS 310 can comprise a number of modules, where each module is tasked with different functions of the ADS 310.

The ADS 310 may comprise a localization module 312 or localization block/system. The localization module 312 is configured to determine and/or monitor a geographical position and heading of the vehicle 300, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy.

The ADS 310 may further comprise a perception module 314 or perception block/system. The perception module 314 may refer to any commonly known module and/or functionality, e.g., comprised in one or more electronic control modules and/or nodes of the vehicle 300, adapted and/or configured to interpret sensory data—relevant for driving of the vehicle 300—to identify e.g., obstacles, vehicle lanes, relevant signage, appropriate navigation paths etc. The perception module 314 may thus be adapted to rely on and obtain inputs from multiple data sources, such as automotive imaging, image processing, computer vision, and/or in-car networking, etc., in combination with sensory data e.g., from the sensor system 320.

The localization module 312 and/or the perception module 314 may be communicatively connected to the sensor system 320 in order to receive sensory data from the sensor system 320. The localization module 312 and/or the perception module 314 may further transmit control instructions to the sensor system 320.

The ADS may further comprise a path planning module 316. The path planning module 316 is configured to determine a planned path of the vehicle 300 based on a perception and location of the vehicle as determined by the perception module 314 and the localization module 312 respectively. A planned path determined by the path planning module 316 may be sent to the maneuvering system 328 for execution.

The ADS further comprises an Automatic Emergency Steering (AES) module 318. The AES module 318 may be tasked with dealing with scenarios or situations identified as potentially dangerous to the driver, passenger or the vehicle 300 itself, or to external objects (e.g., other people, animals, vehicles, infrastructure, buildings etc. For example, the AES module 318 may determine and/or execute maneuvers of the vehicle in order to reduce a risk of incidents, such as avoiding a collision with an obstacle (e.g., breaking or steer to avoid). Thus, the AES module 318 may be configured to determine and/or instruct the maneuvering system 328 to perform an automatic collision avoidance steering maneuver. Additionally, the AES module 318 may provide a warning to the driver of the potential collision. The techniques of the present inventive concept, described in the foregoing with reference to FIG. 1 and FIG. 2, may be performed in the AES module 318. More specifically, the device 200 (not shown) may be part of the AES module 318. Alternatively, the device 200 may be provided within the control system 302 of the vehicle 300, or more specifically, within the ADS 310, and be communicatively connected to the AES module 318. In other words, the device 200 may determine whether an automatic collision avoidance steering maneuver (determined by the AES module 318) should be executed or not. The result (i.e., whether the automatic collision avoidance steering maneuver should be executed or not) may then be communicated as a decision to the AES module 318. If it should be executed, the AES module 318 may in turn communicate the instructions of how the collision avoidance steering maneuver should be performed to the maneuvering system 328.

It should be understood that parts of the described solution may be implemented either in the vehicle 300, in a system located external the vehicle, or in a combination of internal and external the vehicle; for instance in a server in communication with the vehicle, a so called cloud solution. The different features and steps of the embodiments may be combined in other combinations than those described. Further, the elements of the vehicle 300 (i.e., the systems and modules) may be implemented in different combinations than those described herein.

Figure 4A:
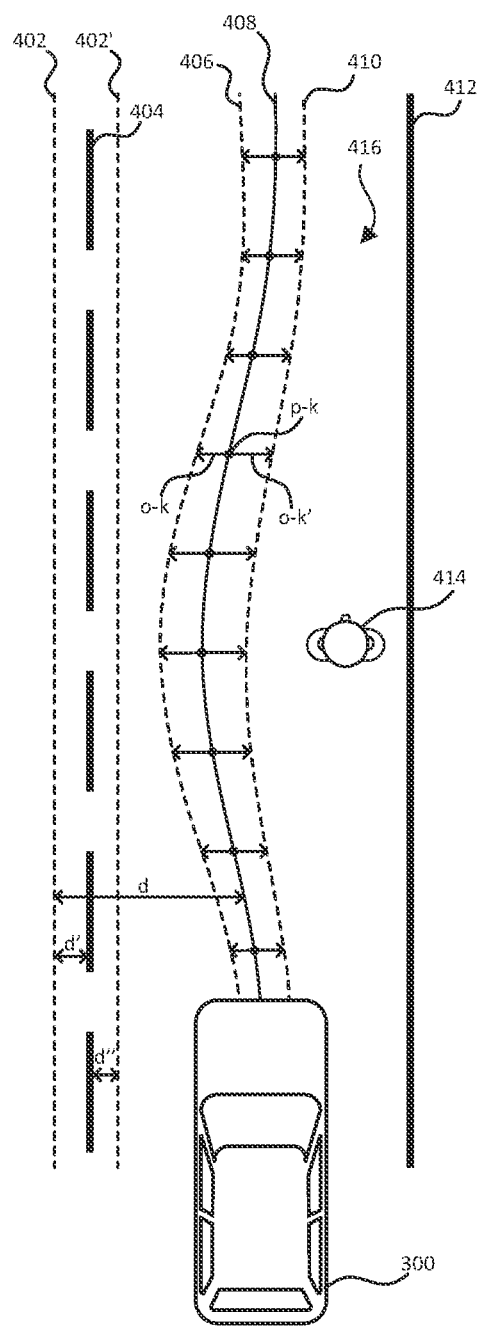
FIGS. 4A and 4B illustrates two different example scenarios where a collision avoidance steering maneuver may need to be executed.
Figure 4B:
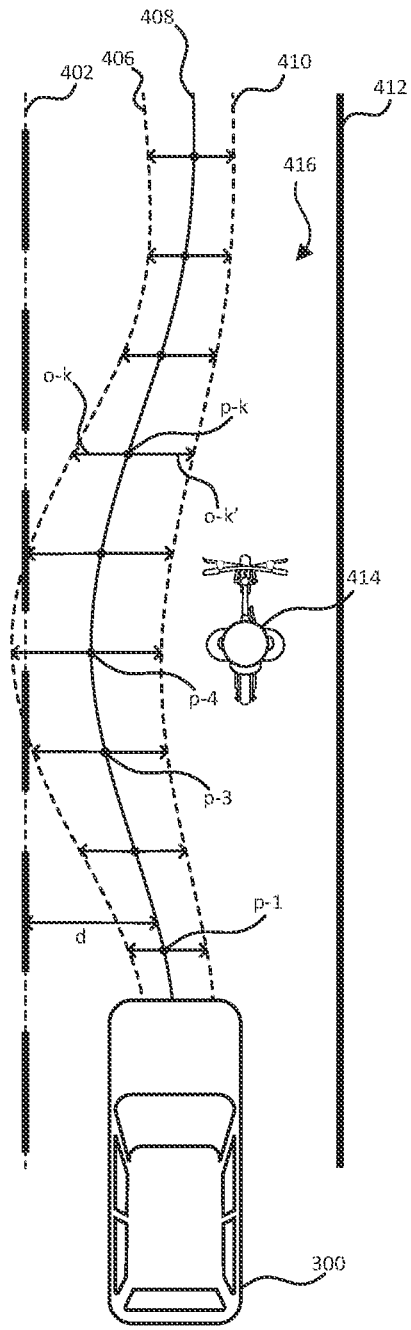

FIGS. 4A and 4B illustrates, by way of example, two different scenarios (in top view) in which an ADS of a vehicle 300 may need to act in order to avoid an incident. The vehicle 300 may be the vehicle 300 as described above in connection with FIG. 3. Thus, the vehicle 300 is configured to perform the techniques of the present inventive concept described in the foregoing with reference to FIG. 1 to FIG. 3.

The examples of FIGS. 4A and 4B depicts scenarios where the vehicle 300 is to avoid a collision with an obstacle 414 (for example, a pedestrian or a cyclist as illustrated herein). The scenario in FIG. 4A illustrates an example where the automatic collision avoidance steering maneuver is determined as to be executed. The scenario in FIG. 4B illustrates an example where the automatic collision avoidance steering maneuver is determined as to not be executed. However, these examples should merely be seen as non-limiting examples for improved understanding of the present inventive concept. As readily understood by the skilled person, the present inventive concept applies also to other scenarios where an automatic collision avoidance steering maneuver of an autonomous or semi-autonomous vehicle may need to be executed in order to avoid a collision with different kinds of objects posing as an obstacle. Further, it should be noted that the scale, size and shape of objects, elements and lines in the figures are exaggerated for illustrative purposes and may not be representative of a real world representation.

Turning to FIG. 4A, the vehicle 300 is illustrated as travelling in a lane 416 defined by a first lane marking 404 and a second lane marking 412. Herein, the first lane marking 404 defines a leftmost boundary of the lane in relation to a direction of travel (bottom-up direction) of the vehicle 300 and the second lane marking 412 defines a rightmost boundary. In the illustrated example, the first lane marking 404 is illustrated as a line dividing bi-directional travel lanes (e.g., a center line of the road) or a line dividing two same-direction lanes. The second lane marking 412 is illustrated as a line representing an edge of the road. However, it should be noted that the illustrated example merely should be seen as a non-limiting example, as the present inventive concept can be applied in any scenario where a vehicle travels in a lane.

Further illustrated in FIG. 4A is a predicted vehicle trajectory 408. As has been discussed above (e.g., in connection with FIG. 1), the predicted vehicle trajectory defines an expected avoidance collision path as a result of an automatic collision avoidance steering maneuver being executed by the vehicle, herein in order to avoid a collision with the obstacle 414. Thus, the vehicle trajectory may be seen as a theoretical path along which the vehicle 300 is expected to travel. The vehicle trajectory can be seen as a discrete representation of the collision avoidance path, i.e., by a number of points p-k, where k goes from 0 to any number N, each corresponding to a different time instance (or position along the path). Each point p-k may comprise one or more parameters, such as a position, a velocity, an acceleration and a jerk of the vehicle in that point. The number of points p-k as illustrated herein is merely for illustrative purposes and may not be indicative of an actual interval between points.

The lines indicated by reference numeral 406 and 410 herein represents a lateral uncertainty of the predicted vehicle path. In other words, when the vehicle 300 tries to follow the predicted vehicle trajectory 408, the vehicle 300 may actually be somewhere between the lines 406 and 410. Thus, the lines 406 and 410 may represent the predicted vehicle trajectory taking into account the steering capability of the vehicle 300. The lateral uncertainty may result from the collision avoidance steering maneuver being too aggressive (e.g., in terms of the required acceleration and jerk in the lateral direction of the vehicle is above the vehicle's capability (e.g., above the first and second threshold as described above)). The lateral uncertainty may be represented by a lateral offset of the vehicle 300 from the collision avoidance path. Each point p-k of the vehicle trajectory 408 can be associated with a different lateral offset o-k, o-k' herein illustrated by an arrow. The length of the arrow may indicate the magnitude of the lateral offset (i.e., the longer the arrow, the larger the offset). The lateral offset o-k, o-k' in each point p-k may comprise a first lateral offset o-k in a first lateral direction and a second lateral offset o-k' in a second lateral direction as illustrated herein. It should be noted that the first lateral offset o-k and the second lateral offset o-k' may have the same or different values. In the illustrated example, the first lateral direction corresponds to a left direction in relation to the vehicle 300 and the second lateral direction corresponds to a right (i.e., an opposite) direction in relation to the vehicle 300. However, in regards to the techniques described in the foregoing with reference to FIG. 1 to FIG. 3, only the lateral offset in the direction pointing towards a lane boundary 402 may need to be used (i.e., the first lateral offset o-k as illustrated herein), since it acts in the direction of a lane boundary 402 which the vehicle 300 is at a risk of crossing.

The lane boundary 402 represents a boundary which the vehicle 300 should not cross (with any part of the vehicle 300). More specifically, in the case of automatic collision avoidance, it is desirable that the vehicle 300 does not travel into a neighboring lane in order to avoid a collision with other objects in the ego-lane 416. The lane boundary 402 should be seen as a virtual boundary (as opposed to the first and second lane markings 404, 412 which, in this example, represents actual road markings). However, the lane boundary 402 may coincide with a lane marking as illustrated in FIG. 4B. Put differently, a lane marking may constitute the lane boundary 402. Alternatively, the lane boundary 402 may be offset from a lane marking as illustrated by the distance d' (between the first lane marking 404 and the lane boundary 402) in FIG. 4A. In either case, the lane boundary 402 may be defined by a lane marking as identified e.g., by the perception module 314 of the vehicle 300. The lane boundary 402 may be arranged at an offset from a lane marker such that it is within a neighboring lane. This may be advantageous in that it may allow the vehicle 300 to travel into the neighboring lane to a certain extent, thus allowing more room for the ADS to avoid the collision. Alternatively, the lane boundary may be arranged at an offset from the lane marker such that it is within the lane 416, as is illustrated by the line 402' and the offset d". This may be advantageous in that it provides a safety margin from the lane marker, thus reducing the risk of the vehicle 300 crossing the lane marker into the neighboring lane.

As the predicted vehicle trajectory 4087 of FIG. 4A, even taking the lateral offset into consideration, appears to be well within the lane 416, the collision avoidance steering maneuver can be expected to be determined as to be executed.

Compared to FIG. 4A, FIG. 4B illustrates a scenario where the automatic collision avoidance steering maneuver is determined as to not be executed. In the scenario of FIG. 4B, a different collision avoidance steering maneuver is required to avoid a collision with the obstacle 414, herein illustrated as a cyclist. If the collision avoidance steering maneuver is executed, the vehicle is expected to follow the predicted vehicle trajectory 408 as illustrated by the solid line intersecting a number of points p-k. Comparing the predicted vehicle trajectory 408 of FIG. 4B with the predicted vehicle trajectory 408 of FIG. 4A, it is clear that the predicted vehicle trajectory 408 of FIG. 4B requires greater maneuvering of the vehicle 300 in order to follow the collision avoidance path. Thus, the lateral acceleration and lateral jerk in one or more points along the vehicle trajectory 408 may be larger than in the example of FIG. 4A. Consequently, the lateral offset o-k, o-k' of the predicted vehicle trajectory 408 may be larger in one or more points. In the illustrated example of FIG. 4B, the line 406 indicating the lateral uncertainty of the vehicle 300 exceeds the lane boundary 402. Thus, the lateral offset o-k, o-k' of the vehicle 300 exceeds the lane boundary 402 in one or more points p-k of the predicted vehicle trajectory 408. Hence, the lateral offset of the predicted vehicle trajectory may exceed the third threshold as described above. Thus, the collision avoidance steering maneuver may be determined as to not be executed. In other words, the lateral offset, e.g., at the point p-4, may exceed the third threshold at that point, and thus it may be determined to not execute the collision avoidance steering maneuver. However, if the predicted vehicle trajectory 408 would have been determined as attainable, the vehicle 300 would be expected to follow the predicted vehicle trajectory 408 (and thus also the collision avoidance path) and the collision avoidance steering maneuver could be executed, since the predicted vehicle trajectory 408 is within the lane 416.

As explained above, in connection with FIG. 1 to FIG. 3, the third threshold may be based on a distance (herein indicated by the reference d) between the predicted vehicle trajectory 408 and the lane boundary 402. In a point of the vehicle trajectory which is relatively far from the lane boundary 402 (e.g., point p-1), larger values of lateral offset may be allowed. However, in a point of the vehicle trajectory 408 which is relatively close to the lane boundary 402 (e.g., point p-3), smaller values of lateral offset may be allowed, since there is a larger risk of the vehicle crossing into the neighboring lane.

FIG. 5 illustrates, by way of example, a set 500 of attainable lateral accelerations and lateral jerks of a vehicle. The set 500 of attainable lateral accelerations and lateral jerks illustrated herein is merely to be seen as an illustrative example for improved understanding, and may not represent an actual set 500 of attainable lateral accelerations and lateral jerks. It should be further noted that the set 500 of attainable lateral accelerations and lateral jerks may be dependent on the velocity of the vehicle. Thus, the illustrated set 500 of attainable lateral accelerations and lateral jerks may only be representative of a certain velocity. In the implementation of the present inventive concept, several different sets of attainable lateral accelerations and lateral jerks associated with various velocities of the vehicle may be used.

The set 500 of attainable lateral accelerations and lateral jerks are herein represented by a region in the two-dimensional space spanned by a first axis of lateral accelerations and a second axis of lateral jerk. Further illustrated are a number of points 502a-g. Each point 502a-g represents an example of predicted lateral acceleration and lateral jerk of a predicted vehicle trajectory. Points which are inside the region representing the set 500 of attainable lateral accelerations and jerk (i.e., points 502d-g) are determined as attainable. Points which are outside the region representing the set 500 of attainable lateral accelerations and jerk (i.e., points 502a-c) are determined as unattainable.

Referring back to FIG. 4, the points 502a-g illustrated herein may represent the predicted lateral acceleration and lateral jerk along different time instances (or different points p-k) of the predicted vehicle trajectory. Since at least one point lies outside the set 500 (i.e., 502a, 502b and 502c), the predicted vehicle trajectory may be determined as unattainable.

The set 500 of attainable lateral accelerations and lateral jerks may be represented by a set of values of attainable lateral accelerations and lateral jerks. The predicted vehicle trajectory may then be determined as attainable or not by determining whether the predicted lateral acceleration and lateral jerk is within the set of values of attainable lateral accelerations and lateral jerks.

Alternatively, the set 500 can be represented by a first threshold of attainable lateral acceleration and a second threshold of attainable lateral jerk. The first and second thresholds may be defined by the borders of a set of attainable lateral accelerations and lateral jerk values such as e.g., the illustrated set 500. For example, the first and second threshold may be the highest (or lowest depending on the point of reference) attainable value of lateral acceleration and lateral jerk respectively of the set 500. Alternatively, the first and second threshold may be different for different values of the other parameter. For example, the first threshold may be a different threshold for each value of lateral jerk. Correspondingly, the second threshold may be a different threshold for each value of lateral acceleration.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method 100 according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

It should be noted that any reference signs do not limit the scope of the claims, that the invention may be at least in part implemented by means of both hardware and software, and that the same item of hardware may represent several "means" or "units".

The invention claimed is:

1. A computer-implemented method for determining whether an automatic collision avoidance steering maneuver for a vehicle equipped with an automated driving system (ADS) should be executed or not, the method comprising:
    obtaining a predicted vehicle trajectory for execution of the collision avoidance steering maneuver, wherein the predicted vehicle trajectory comprises a predicted lateral acceleration and a predicted lateral jerk of the vehicle along the predicted vehicle trajectory;
    obtaining a first threshold of attainable lateral acceleration and a second threshold of attainable lateral jerk of the vehicle;
    determining whether the predicted vehicle trajectory is attainable or not by comparing the predicted lateral acceleration with the first threshold and the predicted lateral jerk with the second threshold;
    in response to the predicted vehicle trajectory being attainable, communicating, to a control system of the vehicle, that the automatic collision avoidance steering maneuver shall be executed; and
    in response to the predicted vehicle trajectory not being attainable:
        determining a lateral offset of the vehicle along the predicted vehicle trajectory based on the predicted lateral acceleration and the predicted lateral jerk of the predicted vehicle trajectory and the first and second threshold;
        in response to the lateral offset being smaller than or equal to a third threshold, communicating, to the control system of the vehicle, that the automatic collision avoidance steering maneuver shall be executed; and
        in response to the lateral offset being greater than the third threshold, communicating to the control system of the vehicle, that the automatic collision avoidance steering maneuver shall not be executed.

2. The method according to claim 1, wherein the predicted vehicle trajectory is determined as attainable if the predicted lateral acceleration is smaller than or equal to the first threshold and the predicted lateral jerk is smaller than or equal to the second threshold, and wherein the predicted vehicle trajectory is determined as not attainable if the predicted lateral acceleration is greater than the first threshold or the predicted lateral jerk is greater than the second threshold.

3. The method according to claim 1, wherein the predicted vehicle trajectory comprises a set of values of predicted lateral acceleration and a set of values of predicted lateral jerk,
    wherein the predicted vehicle trajectory is determined as attainable if each value of the set of values of predicted lateral acceleration is smaller than or equal to the first threshold and each value of the set of values of predicted lateral jerk is smaller than or equal to the second threshold, and the predicted vehicle trajectory is determined as unattainable if at least one of the values of the set of values of predicted lateral acceleration is greater than the first threshold or at least one value of the set of values of predicted lateral jerk is greater than the second threshold.

4. The method according to claim 1, wherein obtaining the first and second threshold comprises obtaining a set of values of attainable lateral accelerations and a set of values of attainable lateral jerk of the vehicle,
    wherein determining whether the predicted vehicle trajectory is attainable or not comprises determining whether the predicted lateral acceleration and the predicted lateral jerk is within the set of values of attainable lateral accelerations and the set of values of attainable lateral jerk respectively.

5. The method according to claim 4, further comprises determining a velocity of the vehicle along the predicted vehicle trajectory, and
    wherein obtaining the set of values of attainable lateral accelerations and a set of values of attainable lateral jerk of the vehicle is based on the determined velocity of the vehicle.

6. The method according to claim 1, wherein determining the lateral offset comprises determining a set of values of lateral offset, wherein each value of the set of lateral offsets is associated with a different point along the predicted vehicle trajectory,
    wherein the third threshold comprises a set of third thresholds, wherein each threshold of the set of third thresholds correspond to a point of the different points along the predicted vehicle trajectory,
    wherein communicating, to the control system of the vehicle, that the automatic collision avoidance steering maneuver shall be executed is performed in response to each value of the set of lateral offsets being smaller than or equal to a corresponding threshold of the set of thirds thresholds, and
    wherein communicating, to the control system of the vehicle, that the automatic collision avoidance steering maneuver shall not be executed is performed in response to at least one value of the set of lateral offsets being greater than its corresponding threshold of the set of third thresholds.

7. The method according to claim 1, wherein the third threshold is based on a distance between the predicted vehicle trajectory and a lane boundary.

8. A non-transitory computer-readable storage medium storing one or more programs configured to be executed by one or more processors of a processing system, the one or more programs comprising instructions for performing the method according to claim 1.

9. A device for determining whether an automatic collision avoidance steering maneuver for a vehicle equipped with an automated driving system (ADS) should be executed or not, the device comprising a control circuitry configured to:
- obtain a predicted vehicle trajectory for execution of the collision avoidance steering maneuver, wherein the predicted vehicle trajectory comprises a predicted lateral acceleration and a predicted lateral jerk of the vehicle along the predicted vehicle trajectory;
- obtain a first threshold of attainable lateral acceleration and a second threshold of attainable lateral jerk of the vehicle;
- determine whether the predicted vehicle trajectory is attainable or not by comparing the predicted lateral acceleration with the first threshold and the predicted lateral jerk with the second threshold;
- in response to the predicted vehicle trajectory being attainable, communicate, to a control system of the vehicle, that the automatic collision avoidance steering maneuver shall be executed; and
- in response to the predicted vehicle trajectory not being attainable:
  - determine a lateral offset of the vehicle along the predicted vehicle trajectory based on the predicted lateral acceleration and the predicted lateral jerk of the predicted vehicle trajectory and the first and second threshold;
  - in response to the lateral offset being smaller than or equal to a third threshold, communicate, to the control system of the vehicle, that the automatic collision avoidance steering maneuver shall be executed; and
  - in response to the lateral offset being greater than the third threshold, communicate to the control system of the vehicle, that the automatic collision avoidance steering maneuver shall not be executed.

10. The device according to claim 9, wherein the predicted vehicle trajectory is determined as attainable if the predicted lateral acceleration is smaller than or equal to the first threshold and the predicted lateral jerk is smaller than or equal to the second threshold, and wherein the predicted vehicle trajectory is determined as not attainable if the predicted lateral acceleration is greater than the first threshold or the predicted lateral jerk is greater than the second threshold.

11. The device according to claim 9, wherein the predicted vehicle trajectory comprises a set of values of predicted lateral acceleration and a set of values of predicted lateral jerk,
wherein the predicted vehicle trajectory is determined as attainable if each value of the set of values of predicted lateral acceleration is smaller than or equal to the first threshold and each value of the set of values of predicted lateral jerk is smaller than or equal to the second threshold, and the predicted vehicle trajectory is determined as unattainable if at least one of the values of the set of values of predicted lateral acceleration is greater than the first threshold or at least one value of the set of values of predicted lateral jerk is greater than the second threshold.

12. The device according to claim 9, wherein obtaining the first and second threshold comprises obtaining a set of values of attainable lateral accelerations and a set of values of attainable lateral jerk of the vehicle,
wherein determining whether the predicted vehicle trajectory is attainable or not comprises determining whether the predicted lateral acceleration and the predicted lateral jerk is within the set of values of attainable lateral accelerations and the set of values of attainable lateral jerk respectively.

13. The device according to claim 12, wherein the control circuitry is further configured to determine a velocity of the vehicle along the predicted vehicle trajectory, and
wherein obtaining the set of values of attainable lateral accelerations and a set of values of attainable lateral jerk of the vehicle is based on the determined velocity of the vehicle.

14. The device according to claim 9, wherein the control circuitry is further configured to determine a set of values of lateral offset, wherein each value of the set of lateral offsets is associated with a different point along the predicted vehicle trajectory,
wherein the third threshold comprises a set of third thresholds, wherein each threshold of the set of third thresholds correspond to a position of the different positions along the predicted vehicle trajectory,
wherein the control circuitry is further configured to communicate, to the control system of the vehicle, that the automatic collision avoidance steering maneuver shall be executed, in response to each value of the set of lateral offsets being smaller than or equal to a corresponding threshold of the set of thirds thresholds, and
communicate, to the control system of the vehicle, that the automatic collision avoidance steering maneuver shall not be executed, in response to at least one value of the set of lateral offsets being greater than its corresponding threshold of the set of third thresholds.

15. A vehicle comprising:
an automated driving system (ADS) configured to execute an automatic collision avoidance steering maneuver; and
a device for determining whether an automatic collision avoidance steering maneuver of the vehicle should be executed or not, the device comprising a control circuitry configured to:
- obtain a predicted vehicle trajectory for execution of the collision avoidance steering maneuver, wherein the predicted vehicle trajectory comprises a predicted lateral acceleration and a predicted lateral jerk of the vehicle along the predicted vehicle trajectory;
- obtain a first threshold of attainable lateral acceleration and a second threshold of attainable lateral jerk of the vehicle;
- determine whether the predicted vehicle trajectory is attainable or not by comparing the predicted lateral acceleration with the first threshold and the predicted lateral jerk with the second threshold;
- in response to the predicted vehicle trajectory being attainable, communicate, to a control system of the vehicle, that the automatic collision avoidance steering maneuver shall be executed; and
- in response to the predicted vehicle trajectory not being attainable:
  - determine a lateral offset of the vehicle along the predicted vehicle trajectory based on the predicted lateral acceleration and the predicted lateral jerk of the predicted vehicle trajectory and the first and second threshold;
  - in response to the lateral offset being smaller than or equal to a third threshold, communicate, to the control system of the vehicle, that the automatic collision avoidance steering maneuver shall be executed; and in response to the lateral offset being greater than the third threshold, communicate to the control system of the vehicle, that the automatic collision avoidance steering maneuver shall not be executed.

* * * * *